United States Patent [19]
Ostand et al.

[11] 3,790,126
[45] Feb. 5, 1974

[54] SINGLE POINT REFUELING NOZZLE

[75] Inventors: Paul R. Ostand; Robert W. Guertin, both of Cincinnati, Ohio

[73] Assignee: Dover Corporation, New York, N.Y.

[22] Filed: Nov. 3, 1971

[21] Appl. No.: 195,173

[52] U.S. Cl. ............................................. 251/89.5
[51] Int. Cl. ............................................. F16k 35/00
[58] Field of Search... 285/9; 137/614.06; 251/89.5, 251/279, 280

[56] References Cited
UNITED STATES PATENTS

| | | | |
|---|---|---|---|
| 1,228,541 | 6/1917 | Durbin.............................. | 285/379 X |
| 1,738,996 | 12/1929 | Hamilton et al.................. | 285/73 X |
| 3,081,102 | 3/1963 | Murray et al...................... | 277/168 |
| 3,381,977 | 5/1968 | Metzger............................. | 285/71 X |
| 3,573,871 | 4/1971 | Warner.............................. | 277/168 |
| 2,716,999 | 9/1955 | Badger et al..................... | 137/614.06 X |
| 3,472,482 | 10/1969 | Gardner............................ | 251/89.5 |

*Primary Examiner*—Henry T. Klinksiek
*Attorney, Agent, or Firm*—J. Warren Kinney, Jr. et al.

[57] ABSTRACT

A single point refueling nozzle for cooperatively engaging the adapter on an aircraft wing so as to permit fueling or defueling of the aircraft is disclosed. The single point refueling nozzle provides cooperatively locking members which prevent opening of the nozzle poppet valve until engaged with the wing adapter. A floating dual cylinder configuration permits sealing engagement of the refueling nozzle poppet valve plus sealing engagement of the nozzle and the underwing adapter by use of a novel nose seal, mounted in the cylinder, which is easily replaceable when damaged or worn. An over-the-center lever arm construction permits locking the poppet valve in the open and closed position.

16 Claims, 7 Drawing Figures

INVENTORS
PAUL R. OSTAND
ROBERT W. GUERTIN
BY
Kinney & Schenk
ATTORNEYS

SINGLE POINT REFUELING NOZZLE

BACKGROUND OF THE INVENTION

This invention relates generally to refueling nozzles and more particularly to a single point refueling nozzle for cooperatively engaging an adapter nozzle on the underside wings of aircraft.

Aircraft fuel tanks are most generally filled from under the wing locations. The fuel is pressure fed to the fuel tanks through a dry connect coupling between the refueler and the aircraft. The refueling nozzle must be engageable with the adapter on the aircraft wing. When engaged, the adapter poppet assembly must be urged open by the refueling nozzle to permit flow of fuel into the tank. A problem exists with the inadvertent closing of nozzles during fueling of some aircraft. If the poppet in the aircraft adapter should, for any reason, cease to exert a downward force on the refueling nozzle poppet, there is a possibility that the nozzle poppet would swing over-center and start to close. The use of a hold-hown spring together with an over-the-center construction of the nozzle poppet assembly would tend to lessen this problem.

Accordingly, it is an object of this invention to provide a single point refueling nozzle which is less affected by back pressure in the fuel tank.

A further object of this invention is to provide a refueling nozzle having dual floating cylinders to cooperatively engage the nozzle poppet valve and the valve seat in the adapter on the wing to provide dual seals against the respective parts.

Another object of this invention is to provide dual floating cylinders which adjust for wear in the respective parts of the adapter and the refueling nozzle.

Yet another object of this invention is to provide an over-the-center construction having locking means to prevent closing of the nozzle poppet valve in the operating condition.

A still further object of this invention is to provide a refueling nozzle having a novel seal ring which may be easily replaced.

SUMMARY OF THE INVENTION

This invention provides an improved single point refueling nozzle for cooperative engagement with a wing fueling nozzle for permitting refueling of aircraft fuel tanks. The refueling nozzle has an over-the-center poppet valve assembly and means for locking the poppet valve in the open and closed positions. The refueling nozzle has dual floating cylinders to permit dual seals, one with the refueling nozzle poppet valve and one with the adapter valve seat.

Other details, uses, and advantages of this invention will become apparent as the following description of an exemplary embodiment thereof presented in the accompanying drawings proceeds.

BRIEF DESCRIPTION OF THE DRAWINGS

The accompanying drawings show a present exemplary embodiment of this invention in which.

DESCRIPTION OF THE ILLUSTRATED EMBODIMENT

Figure 1:
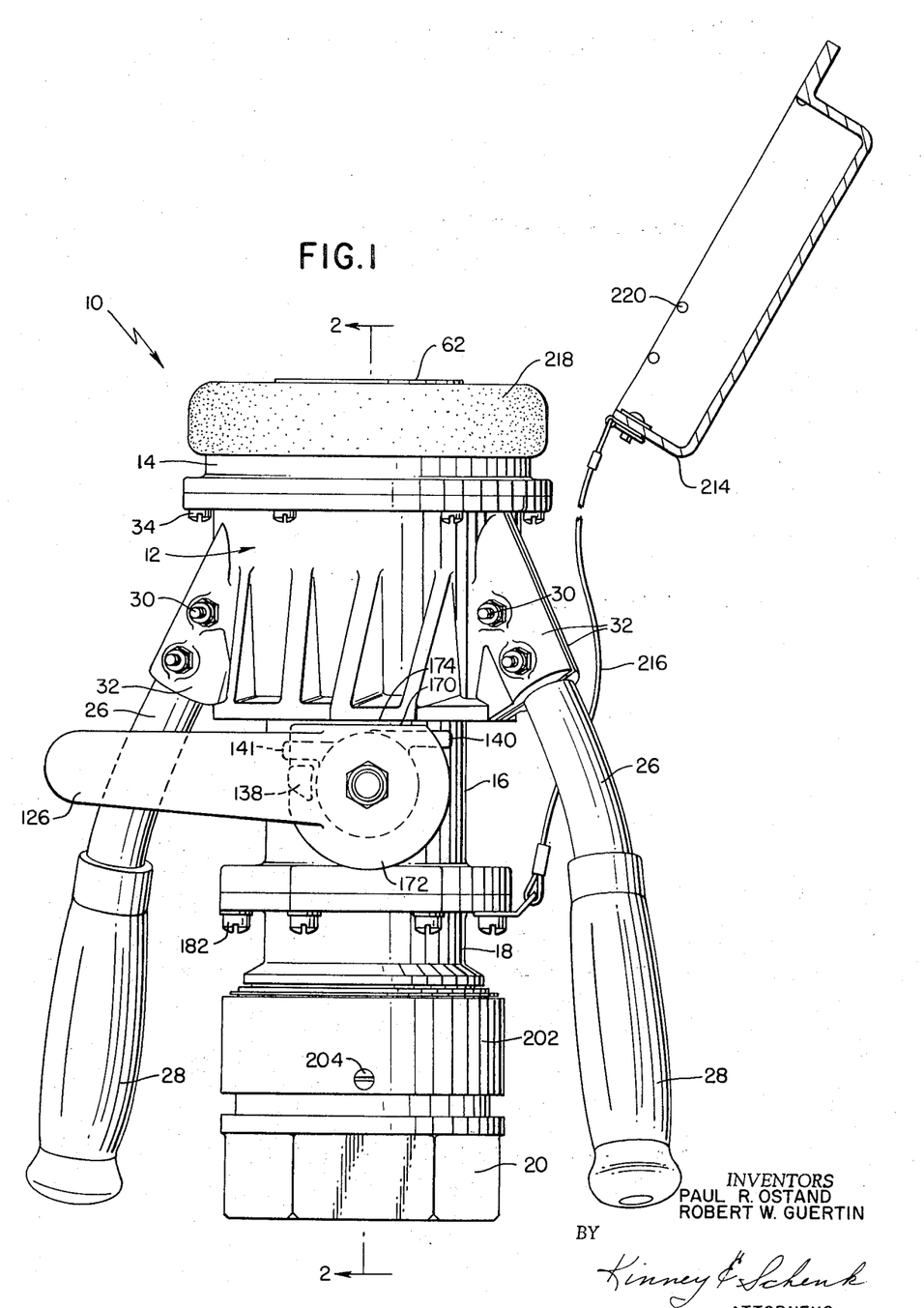
FIG. 1 is an elevational view of the single point refueling nozzle in the closed position.
Figure 2:
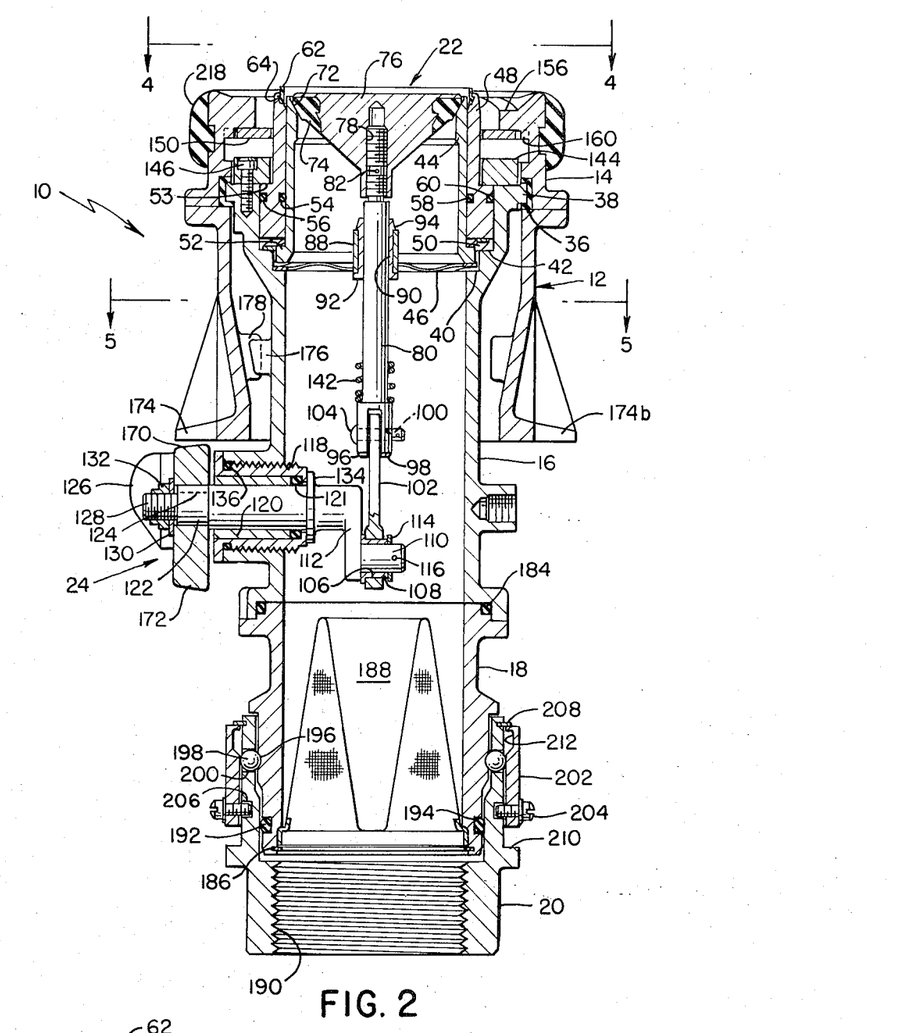
FIG. 2 is a sectional view of FIG. 1 taken on the line 2—2 of FIG. 1 showing the nozzle in the closed position.
Figures 3, 6:
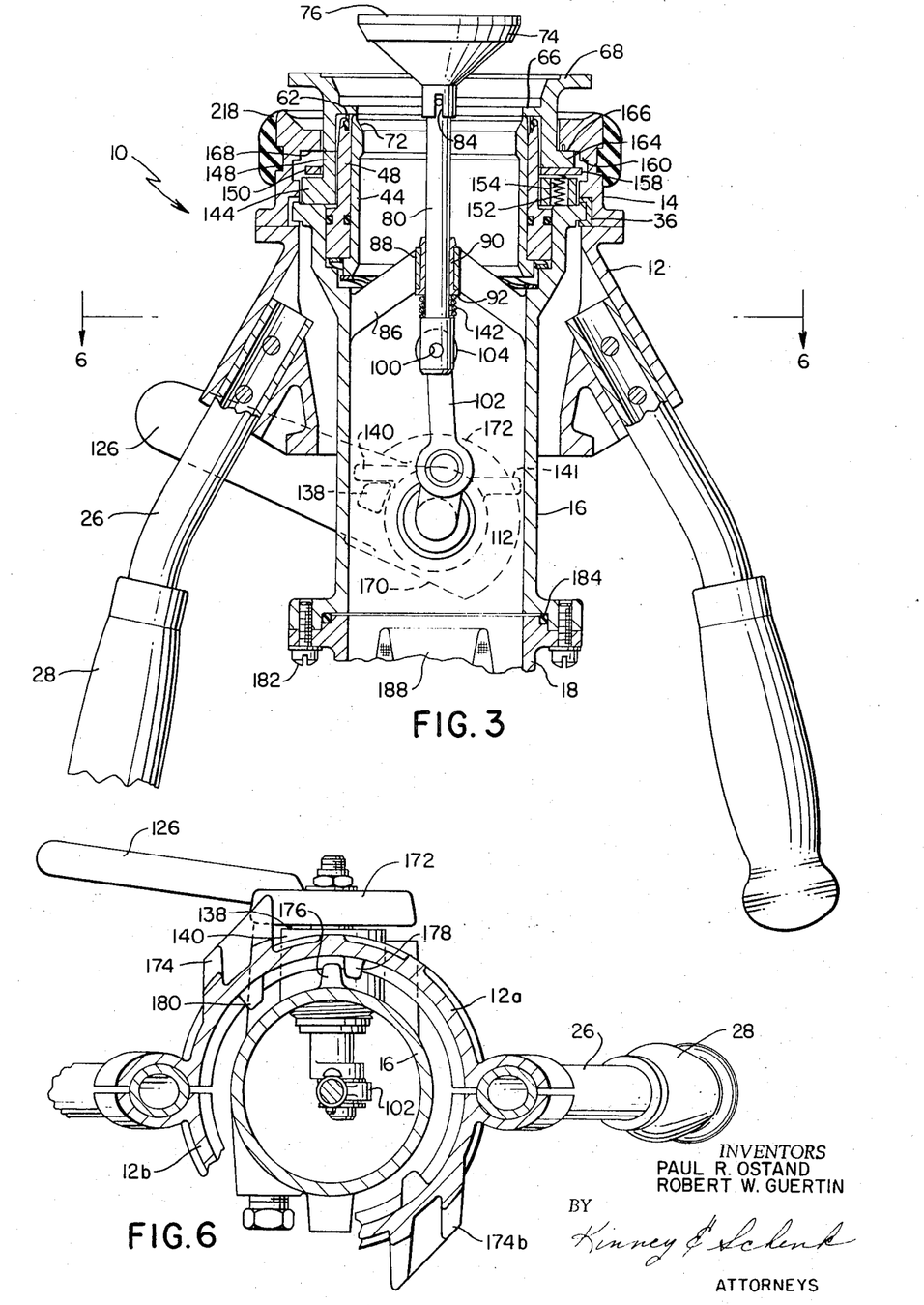
FIG. 3 is a sectional view similar to FIG. 2, rotated 90°, and showing the refueling nozzle in the opened position.
FIG. 6 is a sectional view taken on theline 6—6 of FIG. 3.

Reference is now made to FIGS. 1, 2 and 3 of the drawings, which illustrate one exemplary embodiment of the improved single point refueling nozzle of this invention, which is designated generally by the reference numeral 10. The refueling nozzle is comprised of a shroud 12, an outer body 14, a main body 16, a swivel tail 18, a swivel body 20, a poppet subassembly 22 and a crank assembly 24. Tubular handles 26, each having a handle grip 28 at one end thereof, are secured to the shroud 12 by any suitable means, such as a nut and bolt 30.

Figure 5:
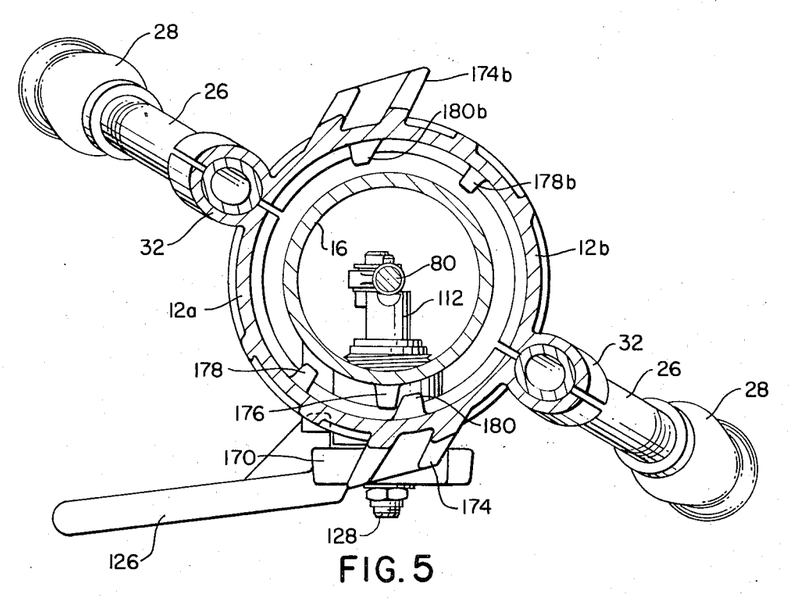
FIG. 5 is a sectional view taken on theline 5—5 of FIG. 2.

The shroud 12 is comprised of two identical semicylindrical shapes designated 12a and 12b, as seen in FIGS. 5 and 6. Each end of the respective shroud halves terminate in semi-circular shaped handle receiving portions 32. The handle receiving portions 32 cooperate to define a handle support and clamping area. The respective nut and bolt 30 protrude through said handle receiving portions 32 to clamp the handles 26 securely therein.

The shroud 12 is mounted to the outer body 14 by any suitable means such as screws 34 (FIG. 1). The outer body 14 is carried on a suitable bearing 36 for rotational movement about the main body 16. The bearing 36 cooperatively engages an outwardly projecting lip 38 of themain body 16. The rotational movement of the outer body 14 relative to the main body 16 will be described in more detail hereinbelow.

The upper end of the main body 16 is formed with two counterbores 40 and 42. An inner cylinder 44 is resiliently carried in counterbore 40 by a wave washer 46. An outer cylinder 48 is resiliently carried in counterbore 42 by a wave washer 50. The wave washers 46 and 50 bias the inner and outer cylinders 44 and 48 in the upward direction as viewed in FIG. 2. However, the wave washers may be compressed in the downward direction. As viewed in FIG. 2, the wave washers 46 and 50 are slightly compressed. The inner and outer cylinders 44 and 48 are complementally formed for limited relative sliding movement in the axial direction. The relative movement of the cylinder is limited by the shoulder 52 of the inner cylinder 44 and shoulder 53 of the outer cylinder 48.

The outer cylinder 48 is formed with two annular grooves 54 and 56 in which are placed suitable seals 58 and 60. The seal 58 provides a seal between the inner cylinder 44 and the outer cylinder 48 and the seal 60 provides a seal between the outer cylinder 48 and the main body 16.

Figure 7:
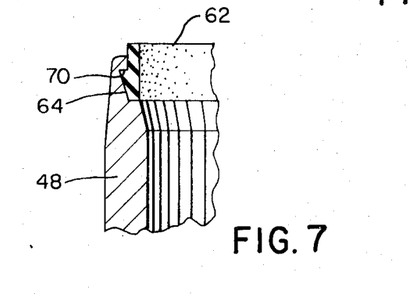
FIG. 7 is a sectional view, not to scale, of the nose seal and outer cylinder.

A nose seal 62 is mounted in a complementally formed channel 64 at the upper end of the outer cylinder 48. The nose seal 62 protrudes beyond the end of the outer cylinder 48 to cooperatively engage a flange 66 on the wing adapter 68 (FIG. 3). The nose seal 62 may be made from any suitable flexible material, such as Viton or the like. As viewed in FIG. 7, the cross-sectional shape of the seal 62 may be defined generally as rectangular with an angular protrusion extending outwardly in an axial direction from the lower periphery of the seal. The outward protrusion of the seal 62 terminates in a shoulder 70 which engages a similar shoulder of the channel 64 so as to retain the seal therein. The novel shape of the nose seal 62 permits rapid replacement of the seal should it become worn or damaged. It is only necessary to grasp the protruding portion of the seal 62 and pull it to separate it from the channel 64. To insert a new nose seal 62, the seal is pushed into engagement with the outer cylinder 48. The angular protrusion of the nose seal 62 will flex inward until such time as the seal 62 has been urged axially a sufficient distance so that the shoulder 70 may snap into place to cooperatively engage the complementally formed channel 64. The nose seal 62 may be replaced on site, such as at the aircraft, and may even be replaced when the refueling nozzle 10 is pressurized.

The inner cylinder 44 is formed wiht a chamfered seating surface 72 at one end thereof for cooperative engagement with a seal 74 which is molded onto poppet valve 76 of poppet subassembly 22. As viewed in FIG. 2, the poppet subassembly 22 is in the closed or sealed position wherein the seal 74 is in engagement with the seating surface 72 of the inner cylinder 44 to prevent flow therethrough.

The poppet 76 is formed with an internally threaded bore 78 which cooperatively receives the threaded end portion of a stem 80. The stem 80 is formed with an aperture 82. The poppet 76 has a slot 84 (FIG. 3) milled across the bottom thereof such that a cotter pin or the like may be inserted through the slot 84 and aperture 82 to maintain the poppet 76 in a specific relationship to the stem 80.

The stem 80 is axially positioned and supported by a web 86 (FIG. 3) having a central bore or guide 88. A bushing 90 is mounted between the stem 80 and the guide 88. The bushing 90 is formed with a substantially large shoulder 92 at the lower end and a relatively small engaging lip 94 at the other end. The small lip portion 94 is more likely to fail before the large shoulder 92. If this should happen, the bushing 90 will not prevent the poppet subassembly from moving from the open position (FIG. 3) to the closed position of FIG. 2. For this safety feature, the bushing 90 must be inserted with the lip portion 94 at the upper end thereof and not vice versa.

The lower end of the stem 80 is bifurcated and the bifurcated elements 96 and 98 have an aperture 100 formed therethrough. A link 102 is pivotally carried between the links 96 and 98 by a pin or the like 104 extending through the aperture 100 and a similar aperture in the link 102. THe other end of link 102 has an aperture 106 therethrough and in which a suitable bearing 108 is mounted. A shaft extension 110 protruding from the cantilever crank 112 is carried by the bearing 108. A washer 114 is mounted on the shaft extension 110 adjacent the end of the bearing 108 and is held in place by a suitable cotter pin or the like which is inserted through an aperture 116 in the shaft extension 110. The washer 114 will prevent excessive lateral movement of the link 102 relative to the shaft extension 110.

The cantilever crank 112 extends through a packing gland 118 threadably mounted and extending through the main body 16. The packing gland 118 contains a bearing 120 and an O-ring seal 121. The cantilever crank 112 extends through the gland 118 to the outside of the nozzle 10 and is reduced in diameter at 122. The reduced portion 122 is formed with a keyway 124 to lock the operating lever 126 in the correct angular relationship to the cantilever crank 112. The terminal end of the cantilever crank 112 is threaded at 128 to accept a washer 130 and a nut 132 to secure the lever 126 to the cantilever crank 112. A flange 134, integral with crank 112, butts against the end of gland 118. The engagement of the flange 134 with the gland 118 prevents the crank 112 from being blown outward due to internal fuel pressure. A static O-ring seal 136 forms a seal for the gland 118 and the main body 16.

In the position shown in FIG. 2, thelinkage consisting of poppet 76, stem 80, link 102, extension the linkage and cantilever crank 112 is in the closed position and is locked over-the-center. The seal 74 is in contact with the sealing surface 72 of the inner cylinder 44. The wave washer 46 provides an upward bias force on the inner cylinder 44 which engages the seal 74 of poppet 76 and at the same time imposes a load upward on the linkage described above which in conjunction with the over-the-center position of the crank locks the poppet 76 in the closed position.

When the lever 126 and the crank 112 are rotated approximately 200° from the position shown in FIGS. 1 and 2, the linkage will take the position shown in FIG. 3. It is seen in FIG. 3 that the link 102 is once again over-the-center with the poppet 76 in the full open position. Any motion or force downward against the poppet 76 will tend to move the link in a clockwise direction as shown in FIG. 3. However, clockwise movement is prohibited because of a stop 138 which is cast on lever 126 which abuts against a stop 140 which is part of the main body 16. A spring 142 is mounted about the stem 80 above the bifurcated elements 96 and 98. The spring 142 abuts the shoulder portion 92 of the bushing 90 thereby producing a net downward force on the stem 80 and overall linkage tending to urge the linkage and particularly link 102 in a clockwise direction. The movement is prohibited by stops 138 and 140 and thereby the linkage is locked in the over-the-center position in the open or flow-through position.

Figure 4:
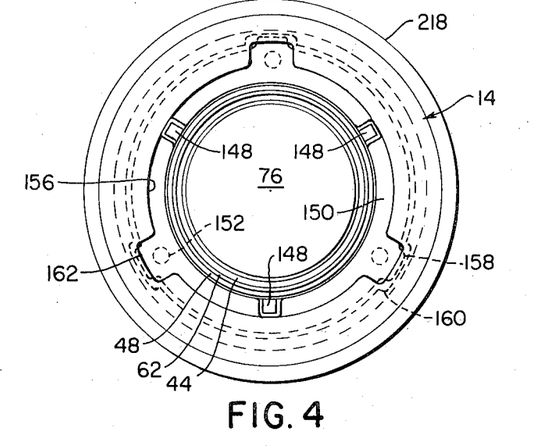
FIG. 4 is a top view taken along the line 4—4 of FIG. 2.

Referring now to FIGS. 2, 3 and 4, a locking ring 144 is secured to the end of the main body 16 by a plurality of screws or the like 146. The annular locking ring 144 has a plurality, in this embodiment three, projections or guides 148 projecting upwardly adjacent the outer cylinder 48. A locking plate 150 is resiliently carried above the locking ring 144 by suitable resilient means such as spring 152 (FIGS. 3 and 4). The springs 152 are mounted in suitable bores 154 in the locking ring 144. The spring 152 acts against the main body 16 at one end and urges the locking plate 150 against the undersurface of an inwardly projecting flange 156 of the outer body 14. The locking plate 150 is provided with outwardly projecting ears 158 which project into complementally formed slots 160 in the outer body 14 when the locking plate 150 is biased in the upward direction as seen in FIG. 2. As seen in FIGS. 2 and 4, the engagement of the protrusions 158 with the slot 160 prevents rotation of the outer body 14 relative to the main body 16. As will be explained herebelow, the locking of the outer body 14 relative to the main body 16 prevents premature or inadvertent opening of the poppet 76 through inadvertent rotation of the lever 126.

The inwardly projecting flange 156 is provided with three slots 162 therethrough for insertion of lugs 164 complementally formed on the wing adapter 68, as seen in FIG. 3. When the refueling nozzle 10 is brought into engagement with the wing adapter 68, the lugs 164 (only one of which is shown) urge the locking plate 150 downwardly against spring 154 so that the protruding ears 158 clear the slots 160. At this point, the shroud 12 and outer body 14 may be rotated relative to the main body 16 so as to unlock the lever 126 for rotational movement. In the engaged position of FIG. 3, it can be seen that the nose seal 62 is in sealing engagement with inwardly projecting flange 66 and the outer cylinder 48 has been moved axially downwardly towards the counterbore 42 against wave washer 50. The upper surface 166 of lugs 164 and the lower surface 168 of flange 156 provide a reference plane inasmuch as the wing adapter 68 is standardized and set by Federal regulations.

Once again referring to FIGS. 1, 2 and 5, it is seen that the lever 126 is formed with a relatively flat portion 170 and a rounded portion 172. The lever 126 is prevented from rotational movement by the shroud projection 174 which overlies the flat portion 170 of the lever 126. While the projection 174 overlies the surface 170, the lever 126 cannot be rotated, hence the cantilever crank 112 cannot be rotated to move the poppet 76 from the closed position. Shroud 12 is prevented from rotation until the refueling nozzle 10 is engaged with the wing adapter nozzle 68 as above described. After such engagement, locking plate 150 is disengaged from the slots 160 and the shroud may be rotated approximately 30° clockwise as FIG. 1 is viewed from the bottom. Overrotation of the shroud 12 relative to the main body 16 is prevented by a stop lug 176 on the main body 16 which engages a similar lug 178 formed on the shroud 12. Likewise, engagement of the lug 176 with a lug 180 prevents overrotation of the shroud 12 relative to the main body 16 in the opposite direction. After rotation of the shroud 12, the shroud projection 174 is clear of the lever 126 and portions 170 and 172, as seen in FIG. 6. At this time, the lever 126 may be rotated approximately 200° from the position shown in FIG. 3 causing the poppet valve 76 to be moved from the closed position to the open position. Raising of the poppet 76 simultaneously opens a similar poppet valve (not shown) of the wing adapter so that the fuel tank may be filled. As previously explained, the poppet 76 is locked in the open position by the over-the-center construction of the linkage and clockwise rotation of link 102 as seen in FIG. 3 is prevented by the stops 138 and 140. It should also be noted that stop 141 cooperates with the stop 138 to prevent rotation of the lever 126 (FIG. 1) when the poppet 76 is in the closed position.

When the refueling nozzle 10 is in the engaged and open position shown in FIG. 3, there is no chance for inadvertent disengagement of the refueling nozzle 10 from the wing adapter 68. Such disengagement is prevented by the interference of the projection 174 with the rounded portion 172 of the lever 126. Hence, once the lever 126 has been rotated to the position in FIG. 3, the shroud 12 may not be counterrotated relative to the main body 16 because protrusion 174 will engage the rounded portion 172. The shroud may not be counterrotated until the lever 126 has been returned to the position shown in FIG. 1 at which point the poppet 76 is once again seated against the inner cylinder 44. At this point, the shroud may be counterrotated until lug 180 engages the lug 176 wherein the lugs 164 of the wing adapter nozzle 68 are aligned with the slots 162 of the flange 156 and the nozzle 10 may be disengaged from the wing adapter 68.

Referring once again to FIGS. 1 and 2, it is seen that the swivel tail 18 and swivel body 20 are of conventional construction. The swivel tail 18 is secured to the main body 16 by a plurality of screws or the like 182. A suitable flange seal 184 provides a seal between the cooperating flanges of the main body 16 and swivel tail 18. A retaining ring 186 holds a strainer 188 in a counterbore formed on the inner surface of the swivel tail 18.

The swivel body 20 is internally threaded at 190 to cooperatively engage a threaded fuel line (not shown) which supplies pressurized fuel to the refueling nozzle 10. A seal 192, mounted in an annular groove 194 of the swivel tail 18 provides a seal between the swivel tail 18 and the swivel body 20.

The swivel tail 18 is provided with an external groove 196 which provides a race for a plurality of balls 198. The balls 198 are supported in angularly formed apertures 200 in the swivel body 20. The balls 198 are urged into the race 196 by a ball retainer 202 held in place by screws 204 which protrude into a slot 206 in the swivel body 20. It is seen that the refueling nozzle 10 is rotatable relative to the swivel body 20. Should it be necessary to repair or clean the strainer 188, it is only necessary to loosen the screws 204 so that they are retracted from the slot 206 such that the ball retainer 202 may slide downwardly into engagement with flange 210 at which point a channel 212 is aligned with the balls 198. The balls 198 will then be urged outwardly into the channel 212 so that the swivel body 20 may be separated from the swivel tail 18. When the swivel body 20 is separated, retaining ring 208 prevents the ball retainer 202 from falling off the swivel body 20.

Referring once again to FIG. 1, it is seen that a cover or dust cap 214 is attached to the refueling nozzle 10 by any suitable lanyard or wire 216. The cover 214 is adapted to fit over a collar 218 which is made from an suitable material such as Buna N. The cover 214 is provided with a plurality of inwardly projecting protrusions or dimples 220 which frictionally engage the collar 218 to secure the cover 214 thereon. When the cover 214 is in the off position, the collar 218 will assist in protecting the refueling nozzle 10 if the nozzle should accidentally be dropped and hit the ground in the collar area due to its resiliency.

As indicated above, the shroud halves 12a and 12b, FIG. 5, are identical in configuration. Accordingly, the shroud 12b is formed with locking lugs 178b, 180b together with the projection 174b. In this way, the part 12b may be interchangeable with shroud part 12a on another refueling nozzle. In addition, the protuberance 174b provides a wear point should the refueling nozzle be inadvertently dragged across the ground.

It should be further noted that the tubular handles 26 and handle grips 28 provide additional wear points if the refueling nozzle 10 is accidentally dragged over the ground. The tubular handles 26 are made of a suitable lightweight material, such as aluminum, and provide an additional safety feature for the refueling nozzle 10. If the refueling nozzle 10 should accidentally be dropped and land on either the handle grip 28 or the handle 26, the handle 26 will buckle or bend before the shroud 12 is cracked or broken.

In operation, the refueling nozzle 10 is grasped by the handle grip 28 and lifted into engagement with the wing adapter 68. When in engagement with the adapter 68 so that the locking plate 150 is depressed and disengaged from the slot 160, the shroud is rotated approximately 30° clockwise as viewed from the bottom until the projection 174 clears the flat portion 170 of lever 126. The lever 126 is then rotated approximately 200° which takes the poppet linkage from an over-the-center position in the closed position to an over-the-center position in the open or flow-through position. The poppet 76 is locked in the open position due to the over-the-center position of the link 102. It should be noted that in the engaged position, FIG. 3, the end of the inner cylinder 44 stops at approximately the same horizontal plane as the nose seal. Hence, the cylinder 44 offers support for the nose seal 62 against pressures. When the fuel tank has been filled, the lever 126 is counterrotated to the first position wherein the poppet 76 is locked in the closed position by the over-the-center position of the lever 102 once again. At this point, the handle grips 28 may be grasped and counterrotated approximately 30° and the refueling nozzle 10 may be disengaged from the wing adapter 68.

It can be seen that this invention provides a single point refueling nozzle which has many advantageous safety features and is foolproof in operation. While the specific embodiment hereinabove described has been specifically described as having dual floating cylinders, it is entirely within the scope of this invention to provide a single floating cylinder rather than dual cylinder. In this configuration, the nose seal would be mounted in the single cylinder and the chamfered seating surface would also be provided in the single cylinder. The over-the-center linkage members of this invention prevent either opening or closing of the poppet valve when the lever is locked in either the open or closed position. Accordingly, it is thus seen that this invention accomplishes the objectives hereinbefore set forth.

While a present exemplary embodiment of this invention has been illustrated and described, it will be recognized that this invention may be otherwise variously embodied and practiced by those skilled in the art.

What is claimed is:

1. A single point refueling nozzle for engagement with and disengagement from an adapter to permit fueling or defueling of fuel tanks comprising a first cylindrical main body; floating cylinder means mounted in one end of said first body and extending axially outward therefrom, said floating cylinder means having an internal seating surface; means biasing said floating cylinder means axially outward of said main body; a nose seal mounted at the outward end of said floating cylinder means for engagement with an adapter to provide a seal between the adapter and the refueling nozzle; a poppet valve mounted at the end of said floating cylinder means, said valve being in sealing engagement against said seating surface in the closed position and being disengaged from the seating surface in the open position; a crank mounted in said first cylindrical main body, one end of said crank extending exteriorly of the body; a link pivotally connecting the other end of said crank with said poppet valve wherein said crank and link are in an over-the-center condition when the poppet valve is both in the closed and opened positions; a rotatable lever exterior of said main body connected with said one end of the crank to permit opening and closing of said poppet valve; first lock means preventing rotation of said lever in the absence of engagement of the refueling nozzle with the adapter; a second cylindrical body of greater diameter mounted at one end of said first body for rotational movement relative thereto, said second cylindrical body formed to receive lugs of the adapter; second lock means preventing relative rotation of said first and second bodies in the absence of engagement of the refueling nozzle with the adapter; and means secured to the other end of said first cylindrical main body for connecting said first cylindrical main body with a source of fuel.

2. The refueling nozzle according to claim 1 in which said floating cylinder means comprises an inner and outer cylinder respectively mounted in one end of said first main body, said internal seating surface being formed on said inner cylinder, and said nose seal being mounted in said outer cylinder, said inner and outer cylinders being mounted to permit relative axial movement one to the other, said inner cylinder having means to limit relative movement in one direction between said inner and outer cylinders.

3. The refueling nozzle according to claim 2 in which said biasing means comprises first and second springs mounted so as to engage said inner and outer cylinders to bias said cylinders axially outward and further comprising means forming a seal between said inner and outer cylinders.

4. The refueling nozzle according to claim 3 in which said poppet valve is formed with a seal molded thereto for engagement with said internal seating surface formed on said inner cylinder.

5. The refueling nozzle according to claim 1 in which said second cylindrical body comprises an outer body and a shroud secured to said outer body, and further comprising handle means secured to said shroud to permit rotation of said shroud and outer body relative to said main body when the refueling nozzle is in engagement with the adapter nozzle.

6. The refueling nozzle according to claim 5 in which said shroud is formed with an outwardly protruding projection, and in which said rotatable lever is formed with a relatively flat portion and a rounded portion, said shroud projection and lever flat and rounded portions defining said first lock means wherein said shroud projection overlies said substantially flat portion when said poppet valve is in the closed position whereby said lever is prevented from rotational movement by the close association of said shroud projection with said flat portion, said lever being rotatable after said shroud and outer body have been rotated relative to said main body wherein said shroud projection no longer overlies said flat portion whereby said lever may be rotated to move the poppet valve to the open position, and whereby said lever rounded portion cooperates with said shroud projection to prevent counterrotation of said shroud and outer body relative to said main body when said poppet valve is open.

7. The refueling nozzle according to claim 6 in which said shroud is formed with spaced first and second inwardly projecting lugs, said main body being formed with an outwardly projecting lug, said main body lug projecting into the space between said shroud first and second lug wherein said lugs cooperatively engage one another to limit the relative movement between said main body and outer body in each direction.

8. The refueling nozzle according to claim 7 in which said shroud is formed of identical semi-cylindrical sections, each end of said section terminating in a semicircular handle receiving portion wherein two special handle receiving portions define a handle support and clamping area and in which said handles are of tubular construction wherein excessive force applied to said handles wll result in bending of said handle portions before damage to said shroud portions occurs.

9. The refueling nozzle according to claim 1 in which said second lock means comprises a locking ring secured to the end of said main body, said locking ring including a plurality of axially extending guides, a locking plate mounted on said locking ring and prevented from rotational movement by said locking ring guides cooperating with complementally formed slots in said locking plate, resilient means biasing said locking plate axially away from said main body and against the undersurface of an inwardly projecting flange formed on said outer body, said locking plate being formed with a plurality of outwardly projecting ears, said outer body being formed with a plurality of complementally formed slots to receive said locking plate ears wherein rotation of said outer body relative to said main body is prevented when said ears are in engagement with said outer body slots and whereby said outer body may only be rotated when said locking plate is urged axially toward said main body so as to disengage said locking plate ears from said outer body slots.

10. The refueling nozzle according to claim 1 further comprising first and second stops formed exteriorly of said main body, a lever stop formed on said lever for cooperative engagement with said first and second stops to limit the rotational movement of said lever, said lever stop and said first stop cooperating to lock said poppet valve in the closed position and said lever stop and said second stop cooperating to lock said poppet valve in the opened position, said cantilever crank and connecting link being in the over-the-center condition in each of the locked positions.

11. The refueling nozzle according to claim 10 further comprising a poppet valve supporting web having a central bore to support said poppet valve for axial movement thereof, said poppet valve including a stem extending therethrough, said stem terminating in a bifurcated end in which said link is pivotally connected, said bifurcated end providing a shoulder of greater dimension than said stem, a spring mounted about said stem between said web central bore and said bifurcated end shoulder wherein in the poppet valve opened position said spring is compressed between said shoulder and web bore whereby said spring acts against said stem shoulder to provide a downward force to assist in locking said poppet valve in the opened position due to the over-the-center condition of said link and cantilever crank.

12. The refueling nozzle according to claim 11 further comprising a bushing mounted between said web bore and said stem, said bushing providing an enlarged shoulder at one end against which said spring acts, the other end of said bushing being provided with a lip portion to hold said bushing in place, said lip portion being subject to failure before said enlarged shoulder portion wherein said bushing will not prevent said poppet valve from closing should failure of the lip portion occur.

13. In a refueling nozzle fore engagement with and disengagement from an adapter to permit fueling or defueling of fuel tanks, the combination comprising an annular nose seal in which the cross-sectional shape of said nose seal is defined generally as rectangular with the outer surface having a protrusion extending angularly and axially outwardly from the outer surface at the lower end of the seal, said protrusion terminating in a shoulder, a cylindrical nozzle having a bore therethrough, and means at one end of said nozzle having a complementally formed channel therein to securedly receive said nose seal in independent locking relationship wherein said nose seal provides a seal between the nozzle and the adapter during engagement thereby.

14. The combination according to claim 13 in which said channel is formed with a complementally formed shoulder to snappingly engage said seal shoulder.

15. The combination according to claim 14 in which said means at the one end of said nozzle includes inner and outer cylinders and in which said channel is formed in said outer cylinder.

16. A single point refueling nozzle for engagement with and disengagement from an adapter to permit fueling and defueling of fuel tanks comprising a first cylindrical main body providing a uniform internal bore, the outlet end of said body being formed with stepped bores; an inner cylinder mounted in one of said counterbores; an outer cylinder mounted in the other of said counterbores, said inner and outer cylinders extending axially outward beyond the end of said main body; a spring mounted between each counterbore and cylinder to resiliently mount said cylinders for limited axial movement relative to said main body; a nose seal mounted at the outward end of said outer cylinder for engagement with an adapter to provide a seal between the adapter and the refueling nozzle; a support web having a central bore therethrough; a poppet valve having a stem extending through said central bore and supported thereby for axial movement, said poppet valve having a closed position in sealing engagement with said inner cylinder for preventing fuel flow therethrough and having an open position when said poppet valve is moved axially away from said inner cylinder and main body to permit fuel flow therethrough; a cantilever crank mounted in said first main body, one end of said crank extending exteriorly of the body and the other end having a shaft protruding therefrom; a link having a bore through one end thereof mounted on said cantilever crank protruding shaft, the other end of said link being pivotally connected with one end of the poppet valve stem wherein said crank and link are in an over-the-center condition when the poppet valve is either in the open or closed positions; a cylindrical outer body mounted about the outlet end of said main body for rotational movement relative thereto, said outer body having an inwardly projecting flange having slots formed therethrough to receive lugs of the adapter; locking means carried between said outer cylinder and siad cylindrical outer body to prevent relative rotation of said outer body when disengaged from an adpater; a shroud connected to said outer body and extending axially toward said main body inlet to substantially enclose said main body, said shroud terminating adjacent said cantilever crank end extending exteriorly of said main body; handles secured to said shroud to permit rotation of said shroud and outer body relative to said main body when said locking means is disengaged; a rotatable lever secured to said one end of said cantilever crank for rotating said crank to open and close said poppet valve; and a cam mounted on the one end of said cantilever crank, said cam having a surface engageable with said shroud for preventing rotation of said lever to move the poppet valve from the closed position to the opened position when the shroud and outer body are in a first position in which the refueling nozzle is not engaged with the adapter whereby when said refueling nozzle is in engagement with the adapter and said outer body and shroud have been rotated relative to said main body said lever may be rotated to open said poppet valve and thereby permit fuel flow from the refueling nozzle to the adapter.

* * * * *